Nov. 22, 1960 — R. H. WHITE — 2,961,025
RETREAD TIRE

Filed Nov. 4, 1957 — 2 Sheets-Sheet 1

INVENTOR.
RICHARD H. WHITE
BY M. A. Hobbs
ATTORNEY

Nov. 22, 1960

R. H. WHITE 2,961,025

RETREAD TIRE

Filed Nov. 4, 1957

INVENTOR.
RICHARD H. WHITE
BY *M. A. Hobbs*
ATTORNEY

United States Patent Office 2,961,025
Patented Nov. 22, 1960

2,961,025

RETREAD TIRE

Richard H. White, Lincoln Ave. Bike Shop, 129 E. Lincoln Ave., Goshen, Ind.

Filed Nov. 4, 1957, Ser. No. 694,206

2 Claims. (Cl. 152—187)

This invention relates to a tire and more particularly to a tire for retreading worn out or damaged tires on lawn mowers, carts, small tractors and similar equipment.

One of the principal objects of the present invention is to provide a retread tire which is easy to apply over a worn out or damaged original tire on equipment of the aforesaid type and which can readily be removed for reconditioning and/or replacement, without employing any special tools or equipment.

Another object of the invention is to provide a tire for power lawn mowers and the like, which can be installed on the vehicle wheel without removing the worn out or damaged tire and which has the appearance of being an original vehicle tire.

Still another object of the invention is to provide a slip-on retread tire which will stay firmly in place for all normal use of the vehicle.

A further object is to provide a retread tire which grips the original tire, avoiding slippage between the two tires, and which has a tread affording good traction with the ground.

Another object of the invention is to provide a resilient, non-pneumatic retread tire which minimizes shocks and vibrations resulting from rough ground encountered in the use of the vehicle and which has a long-lasting, self-cleaning tread suitable for use on soft ground and grass and on concrete.

Additional objects and advantages will become apparent from the following description and the accompanying drawings, wherein.

Referring more specifically to the drawings, numeral 10 designates a conventional power driven reel type lawn mower, 12 the rotary cutting blades, 14 a motor for driving the blades, 16 the motor bed, 18 the mower handle, and 20 drive wheels on which my retread tires 22 have been mounted over the original unremoved tires. The use of the present tire is not limited to any particular type or make of equipment but may be used satisfactorily on either the reel, rotary or hand lawn mowers, carts, garden and lawn tractors, and similar small equipment primarily of the power driven type. It is also adapted for use with solid, hollow or pneumatic tires of rubber or rubber-like material, and can be applied to these tires either before or after the original tread has been worn from the tire.

Figure 1:
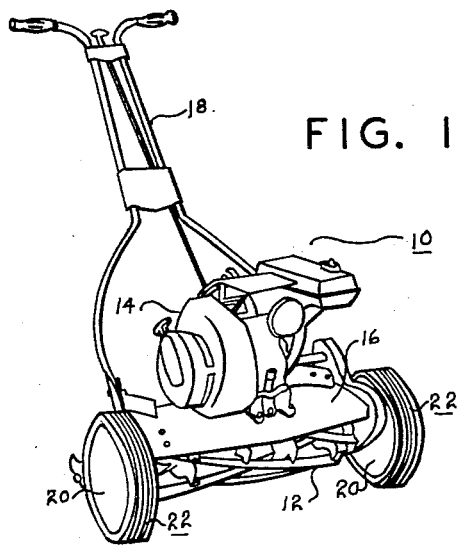
Figure 1 is a perspective view of a lawn mower which is exemplary of the type of equipment for which the present tire is primarily designed.
Figure 3:
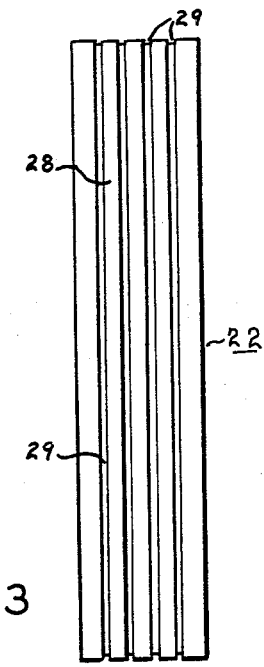
Figure 3 is a peripheral side elevational view of the tire removed from the wheel.
Figure 2:
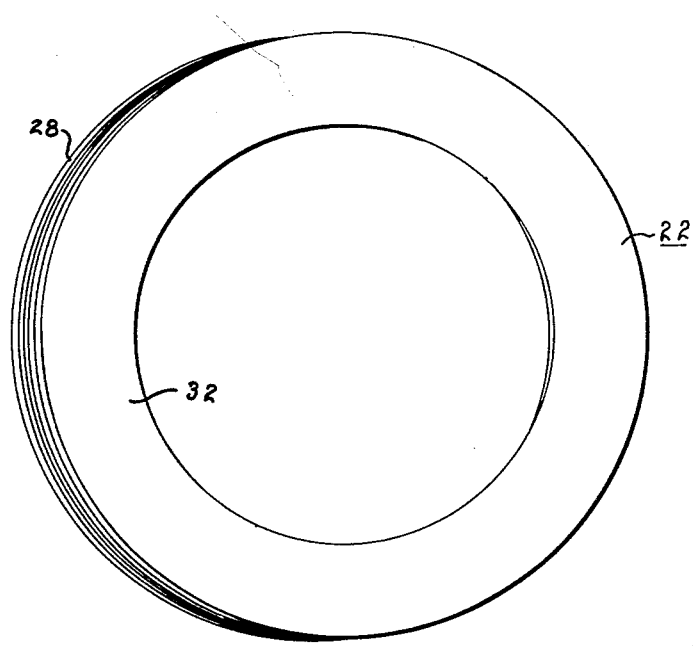
Figure 2 is an oblique view of my tire removed from the vehicle wheel.
Figure 4:
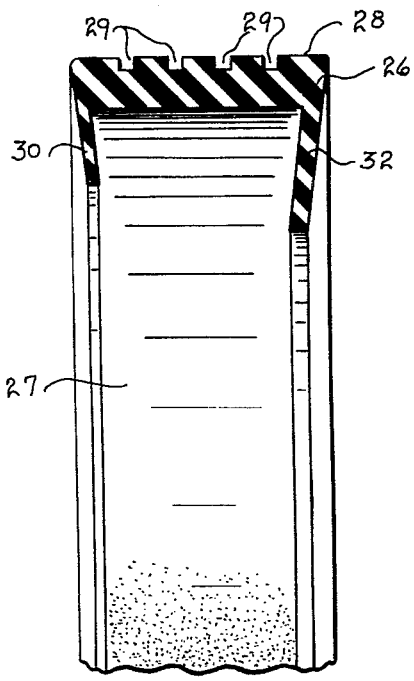
Figure 4 is an enlarged fragmentary cross sectional view of the tire removed from the wheel.
Figure 5:
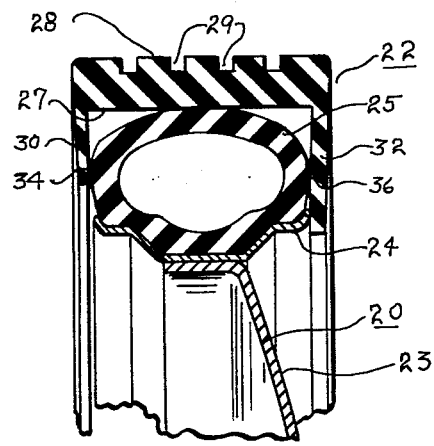
Figure 5 is an enlarged fragmentary cross sectional view of the tire and wheel on which the tire is mounted.

In Figure 5 the wheel 20 of a conventional lawn mower is shown in part with my tire mounted thereon in the position it assumes during normal operation of the vehicle. The wheel consists of a disc-shaped portion 23 having a hub (not shown) and a rim 24 joined rigidly to the periphery of disc-shaped portion 23 and having mounted thereon a hollow rubber tire 25. Tire 25 is the original tire of the lawn mower and has been used until the tread is substantially removed and the edges worn until the peripheral surface is arcuate and the two outside edges appreciably rounded. While this general shape is found on most severely worn original tires, my tire will operate and can be used satisfactorily with various other shapes of peripheral surfaces, including substantially flat peripheral surfaces around the tire at and on either side of the center.

The present tire 22 has an annular body portion 26 of relatively thick rubber or rubber-l'ke material, having inner and outer substantially flat surfaces 27 and 28 extending parallel with the axis of the wheel. The external surface 28 is provided with a tread consisting of a series of relatively deep annular grooves 29 which are rectangular in cross section and spaced uniformly from one another across the surface of the body of the tire. These annular grooves provide good traction between the t're and the ground and give an attractive appearance to the tire. The internal surface 27 is preferably roughened by sand blasting or other suitable process so that it will frictionally grip the worn suurface of the original tire and prevent relative movement between the original t're and my retread tire when the vehicle is in use. The body of the tire is held in place on the crown of the worn original tire by internal and external side walls 30 and 32, both of which are joined integrally with and extend inwardly from the outs'de edges of body 26 to the point where they will effectively grip the sides of the original tire as shown at numerals 34 and 36. Body 26 is somewhat flexible so that it will yield as the vehicle passes over uneven or rough ground but is firm enough to maintain its general rectangular cross sectional shape shown in Figure 5, so that both s'de walls 30 and 32 effectively and continuously grip the sides of the original tire regardless of the conditions encountered during operation of the vehicle. The external side wall 32 is constructed of a substantially thicker section and extends further inwardly towards the axis of the tire than the internal side wall 30 in order to prevent the tire from being accidentally removed or becoming displaced by contact with curbs or the edge of walks and driveways, frequently encountered in the operation of lawn mowers and the like.

Figure 6:
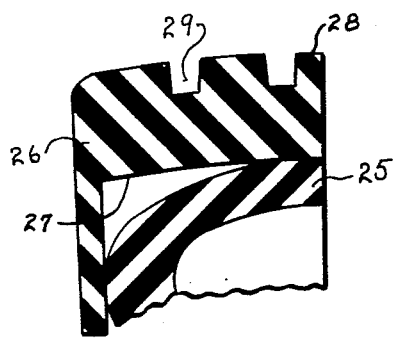
Figure 6 is an enlarged fragmentary cross sectional view of my tire and the worn original tire of the vehicle, showing the manner in which the tire cleans itself during the operation of the vehicle.

Tire 22 can be readily and easily applied to wheel 20 over the original tire 25 by merely slipping the relatively narrow and resilient internal s'de wall 30 over the crown and inside edge of tire 25. When this has been done, my tire automatically adjusts itself on tire 25 in proper operating position shown in Figure 5 with internal surface 27 seated firmly on the peripheral surface of t're 25 and side walls 30 and 32 in firm engagement with the sides of said tire. As the vehicle on which my tire has been mounted is operated and traverses uneven and bumpy terrain, body 26, which is unsupported at its outside edges by worn tire 25, is continually flexed by uneven pressure being appl'ed to the broad tread causing the body to bend inwardly to a slightly arcuate shape as shown in Figure 6. This inward flexing of the unsupported sides of body 26 causes grooves 29 to spread at their outside edges so that they lose their grip on any entrapped foreign objects such as stones, sticks, dried soil and the like which then drop from the grooves. This constant flexing of the retread tire and the repeated spreading of the grooves keep the tire clean and grooves free of material which would otherwise interfere with effective traction between the tire and the ground. The flexing of the tire along the unsupported portion of the tire body 26 also has the further advantage of absorbing shock from bumps and vibration and of presenting a greater area of the tread to the ground or other supporting surface so that better traction is obtained than if the flexing were not present in the operation of the tire.

The retread may be used until it is worn out and then removed and replaced by a new retread tire; the original tire, having been fully protected from wear by the retread tire, remains in satisfactory condition for receiving successive retread tires.

While only one embodiment of my retread tire has been illustrated herein various changes and modifications may be made without departing from the scope of the present invention.

I claim:

1. In combination with worn tires having rounded lateral peripheral corners, a retread tire comprising a pre-formed annular body portion of firm rubber-like material having a broad external surface extending parallel with the axis of the tire and a broad rough internal surface extending parallel with the axis of the tire, a plurality of equally spaced annular grooves rectangular in cross section in said external surface encircling the tire, an inner annular side wall of rubber-like material joined integrally to one edge of said body portion and sloping inwardly throughout from said body portion toward the other edge, and outer annular side wall of rubber-like material joined integrally to said other edge of said body portion and sloping inwardly throughout from said body portion toward said inner side wall, said outer side wall being thicker and extending further toward the center than said inner side wall.

2. In combination with worn tires having rounded lateral peripheral corners, a retread tire comprising a pre-formed annular body portion of firm rubber-like material having an external surface extending parallel with the axis of the tire and a broad internal surface extending parallel with the axis of the tire, a plurality of annular grooves in said external surface, an inner annular side wall of rubber-like material joined to one edge of said body portion and sloping inwardly from said body portion toward the other edge to engage the inner side wall of said worn tire, and an outer annular side wall of rubber-like material joined to said other edge of said body portion and sloping inwardly from said body portion toward said inner side wall to engage the outer side wall of said worn tire, said outer side wall extending further toward the center than said inner side wall.

References Cited in the file of this patent

UNITED STATES PATENTS

| | | |
|---|---|---|
| 870,796 | Parker | Nov. 12, 1907 |
| 2,365,279 | Kraft | Dec. 19, 1944 |
| 2,505,794 | Schofield | May 2, 1950 |
| 2,580,272 | Bell | Dec. 25, 1951 |
| 2,707,014 | Gramelspacher | Apr. 26, 1955 |
| 2,777,497 | Hildebrant | Jan. 15, 1957 |
| 2,787,473 | Chiodo | Apr. 2, 1957 |

FOREIGN PATENTS

| | | |
|---|---|---|
| 482,704 | France | Jan. 23, 1917 |